G. FARNSWORTH.
AUTOMOBILE TOP ATTACHMENT.
APPLICATION FILED NOV. 4, 1916.
1,249,730.
Patented Dec. 11, 1917.
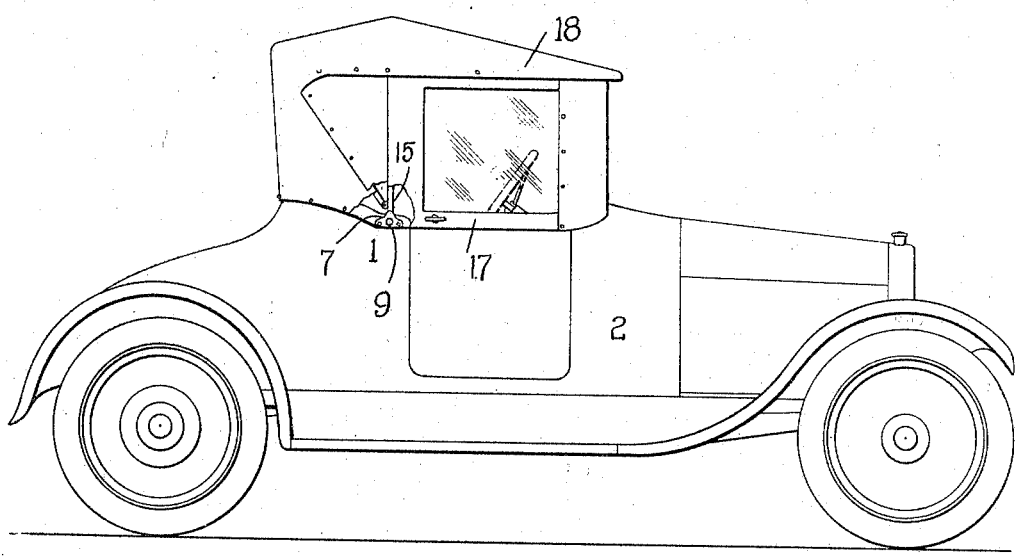
Fig. 1
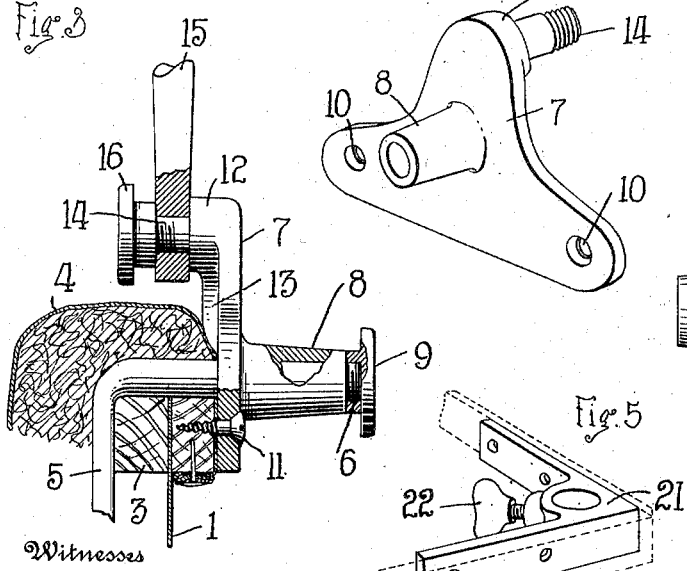
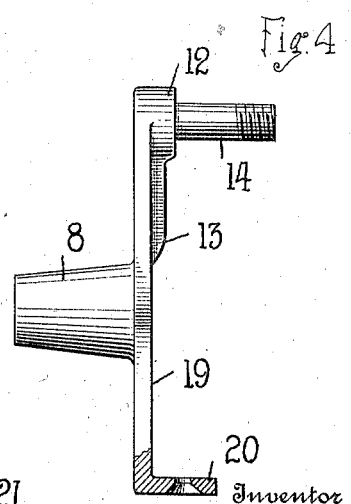
Witnesses
Arthur F. Draper
Karl H. Butler
Inventor
Grover Farnsworth
By Barthol & Barthol
Attorneys

UNITED STATES PATENT OFFICE.

GROVER FARNSWORTH, OF DETROIT, MICHIGAN.

AUTOMOBILE-TOP ATTACHMENT.

1,249,730. Specification of Letters Patent. Patented Dec. 11, 1917.

Application filed November 4, 1916. Serial No. 129,441.

*To all whom it may concern:*

Be it known that I, GROVER FARNSWORTH, a citizen of the United States of America, residing at Detroit, in the county of Wayne and State of Michigan, have invented certain new and useful Improvements in Automobile-Top Attachments, of which the following is a specification, reference being had therein to the accompanying drawings.

This invention relates to an automobile top attachment, and more particularly to attachments which will permit of an especially designed top being supported by the usual side irons so that the top will aline with the side walls of the automobile body and collapse thereon. The side irons now commonly used in automobile bodies support the bows or bow sockets spaced from the outer sides of the automobile body, consequently when the side curtains are in position to provide an inclosure for the occupants of an automobile, there is an open space between the lower edges of the side curtains and the upper edges of the side walls of the automobile body. Now, in connection with that type of automobile, styled a "roadster," it is the practice to use cabriolet tops having portions thereof carried by the door of the "roadster" to swing or move therewith. When the automobile door is closed and flush with the wall of the automobile body, it is practically impossible to make a neat connection between that portion of the top supported by an ordinary side iron and that portion of the top carried by and alining with the automobile door, therefore, I have devised an attachment for the side irons of an automobile body which will permit of the top bows or bow sockets being placed in alinement with that portion of the top carried by the door of the automobile. In consequence of this arrangement, that portion of the top carried by the door of an automobile can be easily connected to that portion of the top supported by side irons, to exclude rain, snow, sleet and the forces of nature and insure a perfect inclosure for the upper portion of an automobile body.

The above and other results are attained by a simple, durable and inexpensive attachment that will be hereinafter specifically described and then claimed, and reference will now be had to the drawing, wherein —

Figure 1 is a side elevation of an automobile of the type commonly styled a "roadster," provided with a cabriolet top and side iron attachments in accordance with my invention;

Fig. 2 is a perspective view of a detached attachment;

Fig. 3 is a side elevation of the attachment, as applied to an iron, the attachment being partly broken away and partly in section, Fig. 4 is a side elevation of a modified form of attachment, partly in section, and Fig. 5 is a perspective view of a top socket for a windshield connection.

In order that my invention may be clearly understood, there is illustrated in Fig. 3, a wall portion 1 of the automobile body 2 shown in Fig. 1, and whether the automobile body is made of metal or wood, it is customary to provide trim rails 3 to which upholstery 4 may be connected. Suitably connected to the wall portion 1 and extending over the trim rails 3 is an ordinary side iron 5 having the outer end thereof screw-threaded, as at 6. As outlined in the beginning this side iron is adapted to support a bow or bow socket of an ordinary top, but I utilize the side iron as a support for my attachment, which comprises a triangular shaped plate 7 having a sleeve portion 8 adapted to fit over the protruding end of the side iron. The plate 7 is placed against the outer trim rail or the upholstery attached thereto and is retained on the iron 5 by a nut or cap 9. Additional fastening means for the plate 7 is afforded by having the lower edge of the plate, preferably at the ends thereof, apertured, as at 10, so that screws 11 or other fastening means may enter the outer trim rail and coöperate with the iron 5 in rigidly holding the attachment.

The upper end or edge of the plate 7 is provided with an inwardly projecting boss 12 reinforced or braced by a rib 13 on the inner side of the plate 7. The boss 12 is provided with a stud 14 adapted for supporting a bow or bow socket 15, which is retained upon the stud 14 by a prop nut 16 or similar retaining means.

As clearly shown in Fig. 3, the stud 14 extends inwardly from the plate 7 and supports the bow or bow socket 15 above the upholstery 4 and in vertical alinement with the wall portion 1 of the automobile body. Now, by reference to Fig. 1, it will be observed that the door portion 17 of the cabriolet top 18 can be easily connected to that portion of the top supported by the bow or bow socket 15, thus precluding possibility of the lower edges of the side curtains or top overhanging the walls of the automobile body with an intervening space. In consequence of this construction and arrangement the forces of nature are excluded from the lower edges of the top or side curtains and the side walls of the top are flush or in alinement with those portions of the top carried by the door of the automobile.

In Fig. 4, there is illustrated a slight modification of my invention, wherein the attachment plate 19 has the lower edge or ends thereof provided with inwardly projecting apertured lugs 20 adapted to extend under an outer trim rail so that the attachment plate may be connected to the lower edge of the trim rail. Otherwise the attachment plate is identical in construction with the showing in Figs. 2 and 3 of the drawing.

In Fig. 5 there is shown an angle top socket 21 having a set screw 22 and this socket is adapted to receive a windshield pin (not shown), so that the top may be rigidly held.

While in the drawings there are illustrated the preferred embodiments of my invention, it is to be understood that the structural elements are susceptible to such variations and modifications as fall within the scope of the appended claims.

What I claim is:—

1. An attachment of the type described comprising a plate having a sleeve adapted to receive the end of a side iron, and a stud projecting inwardly from said plate above the side iron.

2. The combination with an automobile body and a side iron carried thereby, of a plate adapted to fit upon said side iron and be connected to the automobile body, and a stud carried by said plate and projecting inwardly above the side iron.

In testimony whereof I affix my signature in the presence of two witnesses.

GROVER FARNSWORTH.

Witnesses:
 KARL H. BUTLER,
 ANNA M. DORR.

Copies of this patent may be obtained for five cents each, by addressing the "Commissioner of Patents, Washington, D. C."